June 7, 1932.  F. SASS  1,862,321
INTERNAL COMBUSTION ENGINE
Filed July 29, 1930
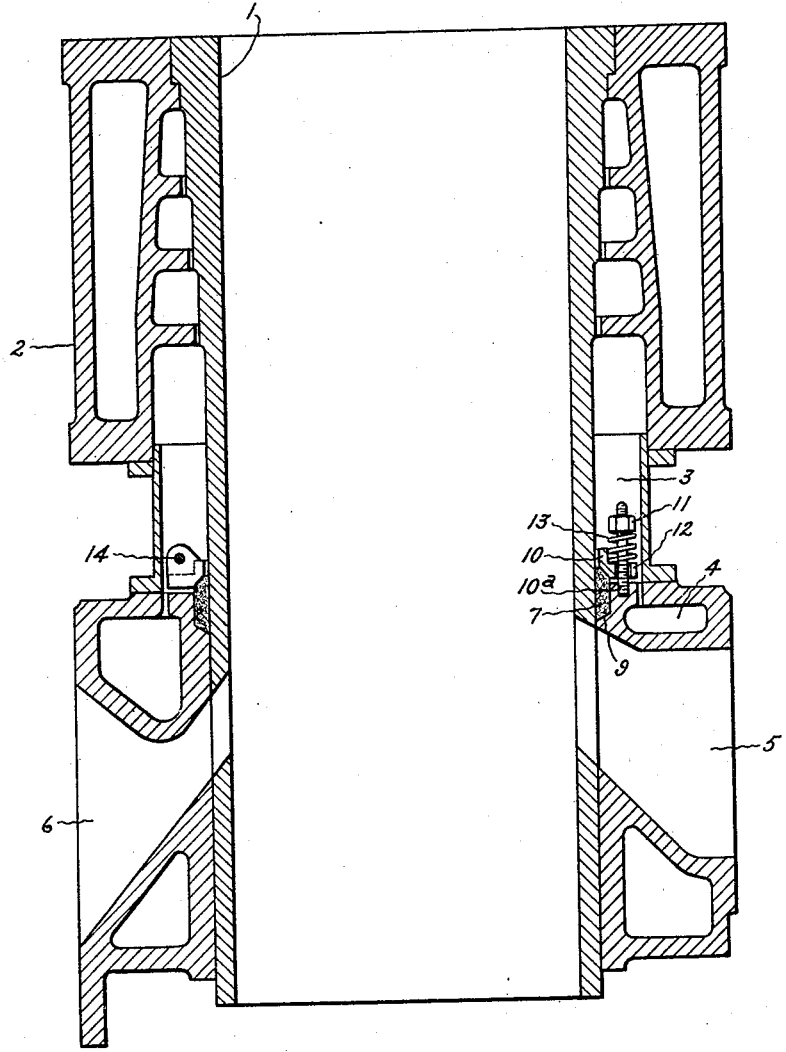
Inventor:
Friedrich Sass,
by Charles E. Tulla
His Attorney Patented June 7, 1932

1,862,321

UNITED STATES PATENT OFFICE

FRIEDRICH SASS, OF CHARLOTTENBURG, GERMANY, ASSIGNOR TO GENERAL ELECTRIC COMPANY, A CORPORATION OF NEW YORK

INTERNAL COMBUSTION ENGINE

Application filed July 29, 1930, Serial No. 471,580, and in Germany August 1, 1929.

The present invention relates to internal combustion engines, and especially to internal combustion engines of the two cycle type which embody in their construction a cylinder liner or bushing arranged in an outer frame or casing with water cooling chamber between the liner and frame.

In order to seal and make water-tight the seam or joint between the liner and cylinder frame, frequently a stuffing box with a packing of organic material is used which is pressed in the opening between the bushing and the cylinder frame by means of a gland which is tightened by screws.

On account of the intensive heating of the liner or bushing, the packing will decrease very soon in size, in that way causing the stuffing box to become inefficient, which is especially disadvantageous when the stuffing box, as is usually the case, is not easily accessible from the outside, a thing which results in the defect not being readily detected. It is also impossible, when the diameter of the stuffing box is large, to pull up all the screws of the gland evenly so that a uniformly good closing cannot be attained.

The object of the present invention is to provide an improved construction for overcoming the above disadvantages, and for a consideration of what is believed to be novel and the invention, attention is directed to the following specification and the claims appended thereto.

According to the invention I provide between the nuts or the heads of the screws and the flange of the gland of the stuffing box yielding washers or springs which are so strong that the gland will follow the decrease in size of the packing and that at all times a uniform pressure of the same strength is exerted on the whole circumference of the packing. Besides, by the use of yielding washers or springs a more uniform distribution over all the screws is obtained.

In the drawing, the figure is a sectional view of an engine cylinder embodying the invention.

Referring to the drawing, 1 is the cylinder liner or bushing which is inserted in the cylinder frame 2 in such a way that it can freely expand in the direction of the axis. The cooling water flows through the chambers 3 and 4. In order to prevent cooling water from getting into the exhaust or scavenging air spaces 5 and 6, a packing 7 is provided which lies in an annular groove 9 which is provided in the cylinder frame and is pressed by the stuffing box gland 10. Gland 10 is held in place by a series of circumferentially spaced gland screws 10$^a$ which pass loosely through the flange of gland 10 and then into frame 2.

Between the nuts 11 of the gland screws and the ring-shaped flange of the gland 12, yielding washers 13 are provided which consist of helical springs. Of course plate springs or other springy bodies can also be used for this. The pressure which is exerted by the yielding washers on the flange of the gland is taken up by the screws of the gland.

By this arrangement, there is obtained an even distribution of pressure on the gland which in turn serves to press the packing uniformly at all points, thus maintaining it tight.

The stuffing box glands 12 may be composed of several circular sections for the purpose of easier installation of the packing 7. In this case the connection of the separate parts of the gland with each other is taken care of by the screws 14.

What I claim as new and desire to secure by Letters Patent of the United States, is:—

1. The combination with an internal combustion engine having a liner and a frame which define between them a water cooling chamber, of means between the liner and a portion of the frame for preventing cooling fluid circulated in the cooling chamber from leaking along the liner, said means comprising an annular packing, a gland for compressing said packing, gland screws having heads on their ends, and spring members arranged between said heads and the gland for forcing it against the packing.

2. The combination with an internal combustion engine having a liner and a frame which define between them a water cooling chamber of means between the liner and a portion of the frame for preventing cooling fluid circulated in the cooling chamber from leaking along the liner, said means comprising an annular packing, a gland for compressing said packing, gland screws having heads on their ends, and spring members arranged between said heads and the gland for forcing it against the packing, said gland comprising a plurality of sections connected together at their ends.

3. The combination with a cylinder for an internal combustion engine comprising a liner, a frame surrounding and supporting said liner, means for scavenging said cylinder which define with said liner and frame a cooling chamber, of a sealing means between said liner and frame for preventing cooling liquid circulated in said cooling chamber from entering the port of said scavenging means, said sealing means comprising a packing arranged in a seat between a wall of said cooling chamber and said liner, a gland engaging said packing, screws projecting through holes in said gland and being fastened to a wall of said cooling chamber, a spring for each of said screws arranged between the screw head and said gland and being adapted to exert a substantially constant, yielding pressure of said gland against said packing.

In witness whereof, I have hereto set my hand this 9th day of July 1930.

FRIEDRICH SASS.